United States Patent [19]
Arndt et al.

[11] 3,869,275

[45] Mar. 4, 1975

[54] HERBICIDAL MIXTURES

[75] Inventors: Friedrich Arndt, Aich; Gerhard Boroschewski, Berlin, both of Germany

[73] Assignee: Schering AG, Berlin and Bergkamen, Germany

[22] Filed: Feb. 26, 1973

[21] Appl. No.: 335,704

Related U.S. Application Data

[63] Continuation of Ser. No. 95,410, Dec. 4, 1970, abandoned, which is a continuation-in-part of Ser. No. 760,692, Sept. 18, 1969, abandoned.

[52] U.S. Cl.................................. 71/92, 71/111
[51] Int. Cl.............................................. A01n 9/22
[58] Field of Search................................. 71/11, 92

[56] References Cited
UNITED STATES PATENTS

| | | | |
|---|---|---|---|
| 3,235,360 | 2/1966 | Soboczenski | 71/92 |
| 3,404,975 | 10/1968 | Wilson | 71/100 |

*Primary Examiner*—Lewis Gotts
*Assistant Examiner*—Catherine L. Mills
*Attorney, Agent, or Firm*—Joseph F. Padlon

[57] ABSTRACT

A combination of 3-cyclohexyl-5,6-trimethylene uracil and at least one carbamoyloxyphenyl carbamate in a suitable medium is provided as a herbicide.

3 Claims, No Drawings

HERBICIDAL MIXTURES

This application is a continuation of S.N. 95,410, filed Dec. 4, 1970, now abandoned which in turn is a continuation-in-part of S.N. 760,692, filed Sept. 18, 1969, now abandoned.

The invention relates to herbicide mixtures having a content of 3-cyclohexyl-5,6-trimethylene uracil and carbamoyloxyphenyl carbamates.

Herbicide mixtures with different ingredients are frequently used. They serve the purpose, for example, of destroying a larger number of plant species more completely in a single treatment than is possible with the use of either of the individual components. Most herbicides, however, display in mixtures merely the action which they would exhibit when used alone. An action different from or going beyond the sole action of the individual components is, in comparison, quite rare and is not foreseeable; as predictions on this art not possible because knowledge of the mechanisms of action underlying such an effect is still lacking.

It has now been found that the following type herbicide mixtures exhibit a better herbicidal action than the individual components of these mixtures. Such mixtures containing 3-cyclohexyl-5,6-trimethylene uracil of the formula

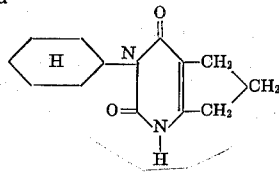

and at least one compound of the general formula

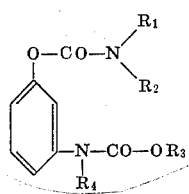

wherein $R_1$ is an unsubstituted or mono- or poly-substituted aryl or aralkyl radical or an unsubstituted or mono- or poly-substituted aliphatic hydrocarbon radical or an unsubstituted or mono- or poly-substituted, mono- or poly-nuclear cycloaliphatic hydrocarbon radical, $R_2$ is hydrogen or an aliphatic hydrocarbon radical, $R_1$ and $R_2$, together with the N atom represent a heterocyclic ring possible containing additional N and/or O atoms, $R_3$ is an unsubstituted or mono- or poly-substituted aliphatic hydrocarbon radical, and $R_4$ is hydrogen or an unsubstituted or mono- or poly-substituted aliphatic hydrocarbon radical.

Especially suitable, according to this invention, are compounds where $R_1$ signifies the phenyl radical or the group

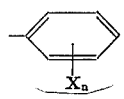

in which X represents halogen, halogen alkyl, alkyl, alkoxy, alkylmercapto, an amino group or the functional derivatives thereof, a nitro, cyano, carboalkoxy, or a carbonamide group, $n$ is an integer from 1 to 3, and the substituents X may be identical or different, $R_2$ and $R_4$ signify hydrogen, and $R_3$ represents an alkyl, alkenyl, or alkinyl radical with 1 to 4 carbon atoms which may, if desired, be terminally halogenated.

The mixtures of the invention still show a sufficient herbicidal action, for example, when used in quantities at the minimal activity limit of the individual components, against weeds which at these quantities are controlled insufficiently or not at all by the individual components of the mixtures. Besides this broad action against a variety of weeds already at small quantities of about 1 to 2 kg per hectare, the mixtures offer the advantage of a high selectivity for crop plants, e.g. beta beets, which are not damaged when the mixtures are used in the post emergence method. To be stressed, in addition, is the action of the mixtures against grasses, which is not satisfactory with the use of the individual components.

The mixture ratio of the individual components in the mixtures may vary within wide limits and depends on the desired control, on the species of the weeds to be controlled, or respectively, of the plants not desired, the age of the weeds or plants, the prevailing weather conditions, and the technique of application. It is therefore not possible to state from the start a certain mixture ratio which would satisfy all possibilities equally, although it has resulted on the other hand that the observed effects are not strictly dependent on certain mixture ratios. By corresponding preliminary tests, the expert is readily able, however, to determine the best mixture ratio for the intended purpose. Generally, the mixture ratio, referred to by weights, may be about 10:1 to 1:10, preferably 1:2 to 2:1.

The total percentage of the two components in the product may advantageously be 2 to 80 per cent by weight, preferably 15 to 50 per cent by weight of the product. The exact concentration of the component mixture used for the product depends mainly on the quantity and method of use in which the product is to be used for weed control.

For the selective control of weeds, as for example in sugar beets, fodder beet, spinach, red beet and stawberries, the preferred active ingredient quantities are approximately 1 to 2 kg/ha, but may be exceeded in special cases.

The use of the mixtures is effected advantageously in a manner common for herbicides in any suitable form of preparations, such as powders, dusts, granulates, solutions, emulsions or suspensions, with addition of liquid and/or solid vehicles or diluents and possibly surfactants, such as wetting, adhesive, emulsifying and/or dispersive aids, as well as fertilizers or other desirable substances. Suitable liquid vehicles are water, mineral oils or other organic solvents, such as xylol, cyclohexanol, cyclohexanone, isophoron, chloroform, carbon tetrachloride, dimethyl formamide, dimethyl sulfoxide, etc. Solid vehicles such as lime, kaolin, chalk, talcum, attaclay and other clays may be considered for use in a mixture with the compounds herein.

As surfactants, anion-active, cation-active, and non-ionogenic products, such as ethoxylated iso-octyl phenol, ethoxylated octyl phenol, nonyl phenol, alkyl phenol polyglycol ether, tributyl phenol polyglycol ether, alkyl aryl sulfonates, alkyl aryl polyether alcohols, isotridecyl alcohol, alkyl sulfates, lauryl ether sulfate, fatty alcohol ethylene oxide condensates, ethoxylated castor oil, polyoxyethylene alkyl ether, ethoxylated polyoxpropylene, sorbitol ester, and lauryl alcohol polyglycol ether acetal, may be used.

The production of these preparations may be carried out in a manner known in the art, e.g. by mixing or grinding processes. If desired, the individual components may be mixed just before their use, as is done in practice for instance in the so-called tank mixing method.

The use of the mixture according to the invention involves important advantages, since to achieve the same or even a better effect on many weeds, smaller quantities of active ingredient are required than when using the individual components singly.

The control of weeds or undesired plants can thus be carried out, according to the invention, more economically with more certain success, less danger, and with optimum protection of the crop plants.

The following are weeds which can be controlled especially well with the mixtures according to the invention. For example, *Amaranthus retroflexus, Capsella bursa pastoris, Chenopodium album, Centaurea cyanus, Erysimum cheiranthoides, Caleopsis tetrahit, Galinsoga parviflora, Lamium amplexicaule, Lamium purpureum, Papaver rhoeas, Raphanus raphanistrum, Senecio vulgaris, Sinapis arvensis, Solanum nigrum, Sonchus oleraceus, Spergula arvensis, Stellaria media, Urtica urens, Matricaria chamomilla, Polygonum convolvulus, Polygonum lapathifolium, Polygonum persicaria, Panicum grus galli, Setaria viridis, Vicia hirsuta, Alopecurus myosumides, Poa annua, Polygonum aviculare, Avena fatua, Anagallis arvensis, Anchusa arvensis, Atriplex patula, Euphorbia helioscopia, Fumaria officinalis, Ranunculus arvensis, Sinapis alba, Sonchus asper, Thlaspi arvense, Veronica persica*, etc.

Most of the individual components of the mixtures of the invention have already become known as herbicides; 3-cyclohexyl-5,6-trimethylene uracil from German Provisional Pat. No. 1,240,698, carbamoyloxyphenyl carbamates from Belgian Pat. No. 679,283.

In the following, carbamates of the above stated general formula to be used according to the invention are listed.

| Compound No. | Name of Compound | Physical constant |
|---|---|---|
| 1 | Ethyl-N-(3-(N'-(2'-chlorophenyl)-carbamoyloxy)-phenyl)carbamate | Mp. 117–119°C |
| 2 | Beta-chlorethyl-N-(3-(N'-(2'-chlorophenyl)-carbamoyloxy)-phenyl)carbamate | Mp. 116–117°C |
| 3 | Methyl-N-(3-(N'-(3'-chlorophenyl-carbamoyloxy)-phenyl) carbamate | Mp. 153–155°C |
| 4 | Ethyl-N-(3-(N'-(chlorophenyl)-carbamoyloxy)-phenyl) carbamate | Mp. 127–128°C |
| 5 | Methyl-N-(3-(N'-chlorophenyl)-carbamoyloxy)-phenyl) carbamate | Mp. 178°C |
| 6 | Ethyl-N-(3-(N'-(4'-chlorophenyl)-carbamoyloxy)-phenyl) carbamate | Mp. 150–151°C |
| 7 | n-propyl-N-(3-(N'-(4'-chlorophenyl)-carbamoyloxy)-phenyl) carbamate | Mp. 147°C |
| 8 | n-butyl-N-(3-(N'-(4'-chlorophenyl)-carbamoyloxy)-phenyl) carbamate | Mp. 138°C |
| 9 | Methyl-N-(3-(N'-(2'-methylphenyl)-carbamoyloxy-phenyl) carbamate | Mp. 158–160°C |
| 10 | Ethyl-N-(3-(N'-(2'-methylphenyl)-carbamoyloxy)-phenyl) carbamate | Mp. 126–127°C |
| 11 | Beta-chlorethyl-N-(3-(N'(2'-methylphenyl)-carbamoyloxy)-phenyl) carbamate | Mp. 129–130°C |
| 12 | Butine-(1)-yl-(3)-N-(3'-(N'-(3''-methyl-phenyl)-carbamoyloxy)-phenyl) carbamate | Mp. 140–141°C |
| 13 | Butine-(1)-yl-(3)-N-(3'-(N'-(4''-methyl-phenyl)-carbamoyloxy)-phenyl) carbamate | Mp. 153–155°C |
| 14 | Butine-(1)-yl-(3)-N-(3'-(N'-(3''-trifluoromethylphenyl)-carbamoyloxy)-phenyl) carbamate | Mp. 129–130°C |
| 15 | Ethyl-N-(3-N',N'-diethylcarbamoyloxy)-phenyl) carbamate | Mp. 75–76°C |
| 16 | Ethyl-N-(3-(N',N'-pentamethylene-carbamoyloxy)-phenyl) carbamate | Mp. 103.5–105.5°C |
| 17 | Ethyl-N-(3-(N'-methylcarbamoyloxy)-phenyl) carbamate | Mp. 131–132°C |
| 18 | Beta-chlorethyl-N-(3-(N'-methyl-carbamoyloxy)-phenyl) carbamate | Mp. 127–128°C |
| 19 | n-propyl-N-(3-(N'-methylcarbamoyloxy)-phenyl) carbamate | Mp. 125–127°C |
| 20 | n-butyl-N-(3-(N'-methylcarbamoyloxy)-phenyl)carbamate | Mp. 111–112°C |
| 21 | Methyl-N-(3-(N'-n-butylcarbamoyloxy)-phenyl) carbamate | Mp. 114–115°C |
| 22 | Ethyl-N-(3-(N'-n-butylcarbamoyloxy)-phenyl) carbamate | Mp. 99.5°C |
| 23 | Secondary butyl-N-(3-(N'-n-butyl-carbamoyloxy)-phenyl) carbamate | Mp. 142–143°C |
| 24 | Methyl-N-(3-(N'-cyclohexylcarbamoyloxy)-phenyl)-carbamate | Mp. 159–161°C |
| 25 | Ethyl-N-(3-(N'-cyclohexylcarbamoyloxy)-phenyl) carbamate | Mp. 128°C |
| 26 | Beta-chlorethyl-N-(3-(N'-cyclohexyl)-carbamoyloxy)-phenyl) carbamate | Mp. 147–148°C |
| 27 | n-propyl-N-(3-(N'-cyclohexylcarbamoyloxy)-phenyl) carbamate | Mp. 160°C |
| 28 | n-butyl-N-(3-(N'-cyclohexylcarbamoyloxy)-phenyl) carbamate | Mp. 140–141°C |
| 29 | Ethyl-N-(3-(N'-(3'-methylphenyl)-carbamoyloxy)-phenyl) carbamate | Mp. 109–110°C |
| 30 | Beta-chlorethyl-N-(3-(N'-(3'-methylphenyl)-carbamoyloxy)-phenyl) carbamate | Mp. 118–119°C |
| 31 | Methyl-N-(3-(N'-(4'-methylphenyl)-carbamoyloxy)-phenyl) carbamate | Mp. 162–163.5°C |

-Continued

| Compound No. | Name of Compound | Physical constant |
|---|---|---|
| 32 | Ethyl-N-(3-(N'-(4'-methylphenyl)-carbamoyloxy)-phenyl) carbamate | Mp. 147–148°C |
| 33 | Ethyl-N-(3-(N'-(3'-trifluoromethylphenyl)-carbamoyloxy)-phenyl) carbamate | Mp. 130–131°C |
| 34 | Beta-chlorethyl-N-(3-(N'-(3'-trifluoromethylphenyl)-carbamoyloxy)-phenyl) carbamate | Mp. 132–133°C |
| 35 | Butine-(1)-yl-(3)-N-(3'-(n'-methylcarbamoyloxy)-phenyl) carbamate | Mp. 157–159°C |
| 36 | Butine-(1)-yl-(3)-N-(3'-(N'-cyclohexyl-carbamoyloxy)-phenyl) carbamate | Mp. 146–147°C |
| 37 | Butine-(1)-yl-(3)-N-(3'-(N'-phenyl-carbamoyloxy)-phenyl) carbamate | Mp. 164–166°C |
| 38 | Butine-(1)-yl-(3)-N-(3'-(N'-(2''-chlorophenyl)-carbamoyloxy)-phenyl) carbamate | Mp. 134–136°C |
| 39 | Butine-(1)-yl-(3)-N-(3'(N'-(4''-chlorophenyl)-carbamoyloxy)-phenyl) carbamate | Mp. 153–155°C |
| 40 | Butien-(1)-yl-(3)-N-(3'-(N'-(2''-methylphenyl)-carbamoyloxy)-phenyl)-carbamate | Mp. 155–156°C |
| 41 | Secondary butyl-N-(3-(N'-cyclohexyl-carbamoyloxy)-phenyl) carbamate | Mp. 149–150°C |
| 42 | Methyl-N-(3-(N'-phenylcarbamoyloxy)-phenyl) carbamate | Mp. 152°C |
| 43 | Ethyl-N-(3-(N'-phenylcarbamoyloxy)-phenyl) carbamate | Mp. 118–119°C |
| 44 | Beta-chlorethyl-N-(3-(N'-phenyl-carbamoyloxy)-phenyl) carbamate | Mp. 149–150°C |
| 45 | n-propyl-N-(3-(N'-phenylcarbamoyloxy) phenyl) carbamate | Mp. 125–126°C |
| 46 | Isopropyl-N-(3-(N'-phenylcarbamoyloxy)-phenyl) carbamate | Mp. 133–135°C |
| 47 | n-butyl-N-(3-(N'-phenylcarbamoyloxy)-phenyl) carbamate | Mp. 145°C |
| 48 | Secondary butyl-N-(3-(N'-phenylcarbamoyloxy)-phenyl) carbamate | Mp. 145–147°C |
| 49 | Methyl-N-(3-(N'-(2'-chlorophenyl)-carbamoyloxy)-phenyl) carbamate | Mp. 124–126°C |
| 50 | Methyl-N-(3-(N'-(3'-methylphenyl)-carbamoyloxy)-phenyl) carbamate | Mp. 139–142°C |
| 51 | Morpholine-N-carboxylic acid-3-carbethoxy-aminophenyl ester | Mp. 114–115°C |
| 52 | Ethyl-N-(3-(N'-alpha-naphthyl)-carbamoyloxy)-phenyl) carbamate | Mp. 150–151°C |
| 53 | Methyl-N-(3-(N'-(alpha-naphthyl)-carbamoyloxy)-phenyl) carbamate | Mp. 166–168°C |
| 54 | Ethyl-N-(3-(N'-(3',4'-dichlorophenyl)-carbamoyloxy)-phenyl) carbamate | Mp. 154–155°C |
| 55 | Methyl-N-(3-(N'-methylcarbamoyloxy)-phenyl) carbamate | Mp. 126–127°C |
| 56 | Methyl-N-(3-(N'-(3',4'-dichlorophenyl)-carbamoyloxy)-phenyl) carbamate | Mp. 188–190°C |
| 57 | Methyl-N-(3-(3'-chloro-4'-methyl-phenyl)-carbamoyloxy)-phenyl) carbamate | Mp. 167–168°C |
| 58 | Ethyl-N-(3-(N'-(3'-chloro-4'-methyl-phenyl)-carbamoyloxy-phenyl) carbamate | Mp. 150–151°C |
| 59 | n-propyl-N-(3-(N'-ethylcarbamoyloxy)-phenyl) carbamate | Mp. 120°C |
| 60 | n-propyl-N-(3-(N'-n-propylcarbamoyloxy)-phenyl) carbamate | Mp. 122°C |
| 61 | n-propyl-N-(3-(N'-isopropylcarbamoyloxy)-phenyl) carbamate | Mp. 154°C |
| 62 | n-propyl-N-(3-(N'-n-butylcarbamoyloxy)-phenyl) carbamate | Mp. 117°C |
| 63 | n-butyl-N-(3-(N'-ethylcarbamoyloxy)-phenyl) carbamate | Mp. 112°C |
| 64 | n-butyl-N-(3-N'-isopropylcarbamoyloxy)-phenyl) carbamate | Mp. 129°C |
| 65 | n-butyl-N-(3-(N'-butylcarbamoyloxy)-phenyl) carbamate | Mp. 108°C |
| 66 | Isopropyl-N-(3-(N'-ethylcarbamoyloxy)-phenyl) carbamate | Mp. 145.5–147°C |
| 67 | Isopropyl-N-(3-(N'-isopropylcarbamoyloxy)-phenyl) carbamate | Mp. 155.5–158°C |
| 68 | Isopropyl-N-(3-(N'-n-propylcarbamoyloxy)-phenyl) carbamate | Mp. 142–144°C |
| 69 | Isopropyl-N-(3-(N'-n-butylcarbamoyloxy)-phenyl) carbamate | Mp. 143–144°C |
| 70 | Isopropyl-N-(3-(N'-cyclohexylcarbamoyloxy)-phenyl) carbamate | Mp. 157.5–158.5°C |
| 71 | Methyl-N-(3-(N'-ethylcarbamoyloxy)-phenyl) carbamate | Mp. 148–151°C |
| 72 | Methyl-N-(3-(N'-isopropylcarbamoyloxy)-phenyl) carbamate | Mp. 156–159.5°C |
| 73 | Methyl-N-(3-(N'-n-propylcarbamoyloxy)-phenyl) carbamate | Mp. 142–144°C |
| 74 | Ethyl-N-(3-(N'-ethylcarbamoyloxy)-phenyl) carbamate | Mp. 146.5–149°C |
| 75 | Ethyl-N-(3-(N'-isopropylcarbamoyloxy)-phenyl) carbamate | Mp. 163–166°C |

-Continued

| Compound No. | Name of Compound | Physical constant |
|---|---|---|
| 76 | Ethyl-N-(3-(N'-n-propylcarbamoyloxy)-phenyl) carbamate | Mp. 134–137°C |
| 77 | n-propyl-N-(3-(N'-tertiary butyl-carbamoyloxy)-phenyl) carbamate | Mp. 164–165°C |
| 78 | Ethyl-N-(3-(N'-tertiary butylcarbamoyloxy)-phenyl) carbamate | Mp. 159–160°C |
| 79 | Methyl-N-(3-(N'-tertiary butylcarbamoyloxy)-phenyl) carbamate | Mp. 165–166°C |
| 80 | Isopropyl-N-(3-(N'-methylcarbamoyloxy)-phenyl) carbamate | Mp. 155.5–157°C |
| 81 | Ethyl-N-(3-(N'-sec. butyl carbamoyloxy)-phenyl) carbamate | Mp. 173–174°C |
| 82 | Ethyl-N-(3-(N'-isobutylcarbamoyloxy)-phenyl) carbamate | Mp. 145–146°C |
| 83 | Methyl-N-(3-(N'-allylcarbamoyloxy)-phenyl) carbamate | Mp. 132–134°C |
| 84 | Ethyl-N-(3-(N'-allylcarbamoyloxy)-phenyl) carbamate | Mp. 123–124°C |
| 85 | Methyl-N-(3-(N-secondary butyl carbamoyloxy)-phenyl) carbamate | Mp. 137–138°C |
| 86 | Methyl-N-(3-(N'-isobutylcarbamoyloxy)-phenyl) carbamate | Mp. 117–118°C |
| 87 | Methyl-N-(3-(N'-n-hexylcarbamoyloxy)-phenyl) carbamate | Mp. 112–113°C |
| 88 | Ethyl-N-(3-(N'-n-hexylcarbamoyloxy)-phenyl) carbamate | Mp. 90–91°C |
| 89 | Ethyl-N-(3-(N'-(2',3'-dimethylphenyl)-carbamoyloxy)-phenyl) carbamate | Mp. 141–142°C |
| 90 | Ethyl-N-(3-(N'-(2',4'-dimethylphenyl)-carbamoyloxy)-phenyl) carbamate | Mp. 158–159°C |
| 91 | Methyl-N-(3-(N'-(2',3'-dimethylphenyl)carbamoyloxy)-phenyl) carbamate | Mp. 154–155°C |
| 92 | Methyl-N-(3-(N'-(2',4'-dimethylphenyl)-carbamoyloxy)-phenyl) carbamate | Mp. 150–151°C |
| 93 | Methyl-N-(3-(N'-n-octylcarbamoyloxy)-phenyl) carbamate | Mp. 117–118°C |
| 94 | Ethyl-N-(3-(N'-n-octylcarbomoyloxy)-phenyl) carbamate | Mp. 90–91°C |
| 95 | Methyl-N-(3-(N'-(4'-fluorophenyl)-carbamoyloxy)-phenyl) carbamate | Mp. 161–162°C |
| 96 | Methyl-N-(3-(N'-(4'-iodo-phenyl)-carbamoyloxy)-phenyl) carbamate | Mp. 174.5–176°C |
| 97 | Methyl-N-(3-(N'-(4'-bromophenyl)-carbamoyloxy)-phenyl) carbamate | Mp. 176–177.5°C |
| 98 | Ethyl-N-(3-(N'-(4'-fluorophenyl)-carbamoyloxy)-phenyl) carbamate | Mp. 133–134°C |
| 99 | Ethyl-N-(3-(N'-(4'-iodophenyl)-carbamoyloxy)-phenyl) carbamate | Mp. 163.5–164.5°C |
| 100 | Ethyl-N-(3-(N'-(4'-bromophenyl)-carbamoyloxy)-phenyl) carbamate | Mp. 148–149°C |
| 101 | Methyl-N-(3-(N'-(1'-methyl-butyl)-carbamoyloxy)-phenyl) carbamate | Mp. 149–149.5°C |
| 102 | Ethyl-N-(3-(N'-(1'-methyl-butyl)-carbamoyloxy)-phenyl) carbamate | Mp. 157–159°C |
| 103 | Methyl-N-(3-(N'-(1',1'-dimethyl-butyl)-carbamoyloxy)-phenyl carbamate | Mp. 124–126°C |
| 104 | Ethyl-N-(3-(N'-(1',1'-dimethyl-butyl)-carbamoyloxy)-phenyl) carbamate | Mp. 121–125°C |
| 105 | Allyl-N-(3-(N'-(3'-methylphenyl)-carbamoyloxy)-phenyl) carbamate | Mp. 119–120°C |
| 106 | Allyl-N-(3-(N'-ethylcarbamoyloxy)-phenyl) carbamate | Mp. 118°C |
| 107 | Allyl-N-(3-(N'-allylcarbamoyloxy)-phenyl) carbamate | Mp. 105°C |
| 108 | Allyl-N-(3-(N'-isopropylcarbamoyloxy)-phenyl) carbamate | Mp. 143°C |
| 109 | Allyl-N-(3-(N'-n-butylcarbamoyloxy)-phenyl) carbamate | Mp. 99–100°C |
| 110 | Allyl-N-(3-(N'-methylcarbamoyloxy)-phenyl) carbamate | Mp. 122–124°C |
| 111 | Allyl-N-(3-(N'-phenylcarbamoyloxy)-phenyl) carbamate | Mp. 117°C |
| 112 | Allyl-N-(3-(N'-tertiary butylcarbamoyloxy)-phenyl) carbamate | Mp. 149–150°C |
| 113 | Allyl-N-(3-(N' -cyclohexylcarbamoyloxy)-phenyl) carbamate | Mp. 134–135°C |
| 114 | Allyl-N-(3-(N,N-dimethylcarbamoyloxy)-phenyl) carbamate | Mp. 87–88°C |
| 115 | Ethyl-N-(3-(N'-(1'-methyl-1'-ethyl-amyl)-carbamoyloxy)-phenyl) carbamate | Mp. 102–103.5°C |
| 116 | Methyl-N-(3-(N'-methyl-N'-phenyl)-carbamoyloxy-phenyl) carbamate | Mp. 124°C |
| 117 | Methyl-N-(3-(N'-(1'-methyl-1'-ethyl-amyl)-carbamoyloxy)-phenyl) carbamate | Mp. 105–106.5°C |
| 118 | Methyl-N-(3-(N'-(2',2'-dimethyl-propyl)-carbamoyloxy)-phenyl carbamate | Mp. 113–114°C |
| 119 | Ethyl-N-(3-(N'-(2',2'-dimethyl-propyl)-carbamoyloxy)-phenyl) carbamate | Mp. 149–150°C |
| 120 | Methyl-N-(3-N'-ethyl-N'-ethyl-N'-(4'-methyl-phenyl)-carbamoyloxy)-phenyl) carbamate | Mp. 99–103°C |
| 121 | Ethyl-N-(3-(N'-ethyl-N'-(4'-methyl-phenyl)-carbamoyloxy-phenyl) carbamate | Mp. 87–88°C |

Continued

| Compound No. | Name of Compound | Physical constant |
|---|---|---|
| 122 | Isopropyl-N-(3-(N'-methyl-N'-phenyl)-carbamoyloxy-phenyl) carbamate | Mp. 87–89°C |
| 123 | Methyl-N-(3-(N'-furfurylcarbamoyloxy)-phenyl) carbamate | Mp. 130–131°C |
| 124 | Ethyl-N-ethyl-N-(3-(N'-(3'-methyl-phenyl)-carbamoyloxy)-phenyl) carbamate | Viscous oil |
| 125 | Methyl-N-ethyl-N-(3-(N'-phenyl-carbamoyloxy)-phenyl) carbamate | Mp. 98–99°C |
| 126 | Ethyl-N-ethyl-N-(3-(N'-phenyl-carbamoyloxy)-phenyl) carbamate | Mp. 92–92.5°C |
| 127 | Methyl-N-ethyl-N-(3-(N'-tertiary-butyl-carbamoyloxy)-phenyl) carbamate | Mp. 92–93°C |
| 128 | Ethyl-N-ethyl-N-(3-(N'-tertiary butyl-carbamoyloxy)-phenyl) carbamate | Mp. 46–57°C |
| 129 | Methyl-N-ethyl-N-(3-(N'-(3'-methyl-phenyl)-carbamoyloxy)-phenyl) carbamate | Viscous oil |
| 130 | Methyl-N-methyl-N-(3-(N'-(3'-methyl-phenyl)-carbamoyloxy)-phenyl) carbamate | Mp. 103–106°C |
| 131 | Ethyl-N-methyl-N-(3-(N'-(3'-methyl-phenyl)-carbamoyloxy)-phenyl) carbamate | Mp. 61–66°C |
| 132 | Ethyl-N-methyl-N-(3-(N'-methylcarbamoyloxy)-phenyl) carbamate | Viscous oil |
| 133 | Methyl-N-methyl-N-(3-(N'-phenyl-carbamoyloxy)-phenyl) carbamate | Mp. 106–109°C |
| 134 | Ethyl-N-methyl-N-(3-(N'-phenyl-carbamoyloxy)-phenyl) carbamate | Mp. 112–119°C |
| 135 | Methyl-N-methyl-N-(3-(N'-ethyl-N'-(3'-methylphenyl)-carbamoyloxy)-phenyl) carbamate | $n_D^{25} = 1.5498$ |
| 136 | Methyl-N-(3-(N'-methoxyphenyl)-carbamoyloxy)-phenyl) carbamate | Mp. 156–157°C |
| 137 | Methyl-N-(3-(N'-phenylcarbamoyloxy)-phenyl)carbamate | Mp. 152°C |
| 138 | Methyl-N-(3-(N'-(3'-nitrophenyl)-carbamoyloxy)-phenyl) carbamate | Mp. 163–164°C |
| 139 | Methyl-N-(3-(N'-(3'-chloro-4'-methyl-mercaptophenyl)-carbamoyloxy)-phenyl) carbamate | Mp. 140–142°C |
| 140 | Allyl-N-(3-(N'-(3'-chloro-4'-methyl-mercaptophenyl)-carbamoyloxy)-phenyl) carbamate | Mp. 145–148°C |
| 141 | Ethyl-N-(3-(N'-(4'-ethylphenyl)-carbamoyloxy)-phenyl) carbamate | Mp. 126–127°C |
| 142 | Ethyl-N-(3-(N'-(4'-methylmercapto-phenyl)-carbamoyloxy)-phenyl) carbamate | Mp. 148–149°C |
| 143 | Ethyl-N-(3-(N'-(3',4'-dimethylphenyl)-carbamoyloxy)-phenyl) carbamate | Mp. 143–144°C |
| 144 | Ethyl-N-(3-(N'-(2'-ethylphenyl)-carbamoyloxy)-phenyl) carbamate | Mp. 150–151°C |
| 145 | Methyl-N-(3-(N'-3',4'-dimethylphenyl)-carbamoyloxy)-phenyl) carbamate | Mp. 158.2°C |
| 146 | Methyl-N-(3-(N'-(2',6'-dimethyl-phenyl)-carbamoyloxy)-phenyl) carbamate | Mp. 158–159°C |
| 147 | Methyl-N-(3-(N'-(2'-ethylphenyl)-carbamoyloxy)-phenyl) carbamate | Mp. 133–135°C |
| 148 | Methyl-N-(3-(N'-(3'-methoxyphenyl)-carbamoyloxy)-phenyl) carbamate | Mp. 122–125°C |
| 149 | Methyl-N-(3-(N'-(3'-fluorophenyl)-carbamoyloxy)-phenyl) carbamate | Mp. 148–149°C |
| 150 | Methyl-N-(3-(N'-beta-chlorethyl-carbamoyloxy)-phenyl) carbamate | Mp. 138–141°C |
| 151 | Methyl-N-(3-(N'-n-butyl-N'-(3'-methyl-phenyl)-carbamoyloxy)-phenyl) carbamate | Mp. 105–106°C |
| 152 | Methyl-N-(3-(N'-(3'-trifluoro-methyl-phenyl)-carbamoyloxy)-phenyl) carbamate | Mp. 159–160°C |

Among these, methyl-N-(3-(N'-(3'-methylphenyl)-carbamoyloxy)-phenyl)carbamate (No. 50) is outstanding as mixture component.

The following experiment examples will more clearly illustrate the invention.

EXAMPLES

In a greenhouse, the plants listed below were treated at a height of growth of 5–10 cm with 0.5 and 1 kg active ingredient per hectare of 3-cyclohexyl-5,6-trimethylene uracil (I), 0.5 and 1 kg active ingredient per hectare of methyl-N-(3-(N'-(3'-methylphenyl)-carbamoyloxy)-phenyl) carbamate (II) and a mixture of 0.5 kg active ingredient per hectare of 3-cyclohexyl-5,6-trimethylene uracil and 0.5 kg active ingredient per hectare of methyl-N-(3-(N'-(3'-methylphenyl)-carbamoyloxy)-phenyl) carbamate (III).

The products, dispersed in 600 liters of water per hectare, were sprayed uniformly over the plants. Ten days after the treatment, the mixture showed for many weed species a clearly better action than the individual components. The tolerance for sugar beets was preserved completely.

|  | A | B | C | D | E | F | G | H | I | K | L | M | N | O |
|---|---|---|---|---|---|---|---|---|---|---|---|---|---|---|
| Active ingredient I | 0.5 | 10 | 10 | 10 | 10 | 10 | 10 | 10 | 10 | 10 | 10 | 10 | 10 | 10 |
|  | 1.0 | 10 | 10 | 8 | 9 | 8 | 8 | 7 | 7 | 8 | 9 | 7 | 6 | 8 |
| Active Ingredient II | 0.5 | 10 | 10 | 1 | 5 | 1 | 0 | 10 | 5 | 10 | 10 | 10 | 10 | 10 |
|  | 1.0 | 10 | 10 | 0 | 0 | 0 | 0 | 5 | 0 | 10 | 8 | 8 | 6 | 6 |
| Mixture III | 1.0 | 10 | 10 | 0 | 0 | 0 | 0 | 0 | 0 | 1 | 2 | 1 | 1 | 1 |
| Untreated | — | 10 | 10 | 10 | 10 | 10 | 10 | 10 | 10 | 10 | 10 | 10 | 10 | 10 |

0 = totally destroyed
10 = no effect
A - kg active ingredient per hectare
B - sugar beet
C - fodder beet
D - Sinapis alba
E - Stellaria media
F - Galinsoga parviflora
G - Senecio vulgaris
H - Matricaria chamomilla
I - Lamium Amplexicaule
K - Amaranthus retroflexus
L - Avena fatua
M - Alopecurus myosuroides
N - Setaria ssp.
O - Centaurea cyanus In mixture with 3-xyclohexyl-5,6-trimethylene uracil, the following have the same biological action: Allyl-N-(3-(N'-(3'-methylphenyl)-carbamoyloxy)-phenyl) carbamate; Butine-(1)-yl-(3)-N-(3'-(N'-(3''-methylphenyl)-carbamoyloxy)-phenyl) carbamate; Methyl-N-(3-(N'-(3'-chlorophenyl)-carbamoyloxy)-phenyl) carbamate; Methyl-N-(3-(N'-(4'-methoxyphenyl)-carbamoyloxy)-phenyl)carbamate; Methyl-N-(3-(N'-phenylcarbamoyloxy)-phenyl) carbamate; Ethyl-N-(3-(N'-phenylcarbamoyloxy)-phenyl) carbamate; Ethyl-N-(3-(N'-(3'-methylphenyl)-carbamoyloxy)-phenyl) carbamate; Methyl-N-(3-(N'-(3'-nitrophenyl)-carbamoyloxy)-phenyl) carbamate; Beta-chlorethyl-N-(3-(N'-(3'-trifluoromethylphenyl)-carbamoyloxy)-phenyl) carbamate; Methyl-N-(3-(N'-(3'-chloro-4'-methylmercaptophenyl)-carbamoyloxy)-phenyl) carbamate; Allyl-N-(3-(N'-(3'-chloro-4'-methylmercaptophenyl)-carbamoyloxy)-phenyl) carbamate; Ethyl-N-(3-(N'-(4'-ethylphenyl)-carbamoyloxy)-phenyl) carbamate; Ethyl-N-(3-(N'-(4'-methylmercaptophenyl)-carbamoyloxy)-phenyl) carbamate; Ethyl-N- (3-(N'-(3',4'-dimethylphenyl)-carbamoyloxy)-phenyl) carbamate; Ethyl-N-(3-(N'-(2'-ethylphenyl)-carbamoyloxy)-phenyl) carbamate; Methyl-N-(3-(N'-(3',4'-dimethylphenyl)-carbamoyloxy)-phenyl carbamate; Methyl-N-(3-(N'-(2',6'-dimethylphenyl)-carbamoyloxy)-phenyl) carbamate; Methyl-N-(3-(N'-(2'-ethylphenyl)-carbamoyloxy)-phenyl) carbamate; Methyl-N-(3-(N'-(3'-methoxyphenyl)-carbamoyloxy)-phenyl) carbamate; Methyl-N-(3-(N'-(3'-fluorophenyl)-carbamoyloxy)-phenyl) carbamate; Methyl-N-(3-(N'-beta-chlorethylcarbamoyloxy)-phenyl) carbamate; Methyl-N-(3-(N'-n-butyl-N'-(3'-methylphenyl)-carbamoyloxy)-phenyl) carbamate; Methyl-N-(3-(N'-3'-trifluoromethylphenyl)-carbamoyloxy)-phenyl) carbamate.

It will be noted that similar biological action is shown by the combinations of 3-cyclohexyl-5,6-trimethylene uracil with the other carbamates listed.

What is claimed is:

1. A process for the selective control of weeds without substantial damage to crop plants which comprises the postemergence application of a herbicidal composition consisting essentially of herbicidally effective amounts of 3-cyclohexyl-5,6-trimethylene uracil and a carbamate selected from the group consisting of methyl-N-(3-N'-(3'-methylphenyl)-carbamoyloxy)-phenyl)carbamate, methyl-N-(3-N'-phenylcarbamoyloxy-phenyl)-carbamate, ethyl-N-(3N'-(3'-methylphenyl)-carbamoyloxy)-phenyl)-carbamate, and methyl N-(3-N'-(3'-, 5'-dimethylphenyl)-carbamoyloxy)-phenyl)-carbamate, the ratio of the weight of said uracil to the carbamate being about 1:1.

2. The process of claim 1, wherein the carbamate is methyl-N-(3-(N'-(3'-methylphenyl)-carbamoyloxy)-phenyl)-carbamate and the ratio of the weight of said uracil to the carbamate is about 1:1.

3. A herbicidal composition the active ingredients of which consist essentially of herbicidally effective amounts of 3-cyclohexyl-5,6-trimethylene uracil and a carbamate selected from the group consisting of methyl-N-(3N'-(3'-methylphenyl)-carbamoyloxy)-phenyl)carbamate, methyl-N-(3-N'phenylcarbamoyloxyphenyl)-carbamate, ethyl-N-(3N'-methylphenyl)-carbamoyloxy)-phenyl)-carbamate, and methyl N-(3-N'-(3'-,5'-dimethylphenyl)-carbamoyloxy)-phenyl)-carbamate, the ratio of the weight of said uracil to the carbamate being about 1:1.

* * * * *